United States Patent Office 2,782,211
Patented Feb. 19, 1957

2,782,211

MANUFACTURE OF DEHYDRO COMPOUNDS OF THE PREGNANE SERIES

Albert Wettstein and Julius Schmidlin, Basel, Switzerland, assignors to Ciba Pharmaceutical Products, Inc., Summit, N. J.

No Drawing. Application August 31, 1954,
Serial No. 453,420

Claims priority, application Switzerland
September 4, 1953

12 Claims. (Cl. 260—397.3)

This invention relates to the manufacture of dehydro compounds of the pregnane series.

On account of their more intensified effect in comparison to the corresponding compounds saturated in 11:12-position, therapeutically active 11:12-dehydro compounds of the pregnane series, for example 11:12-dehydro-progestrone which is useful in the treatment of copus luteum hormone deficiency and 11:12-dehydro-desoxycorticosterone which is useful for the treatment of adrenal cortical insufficiency are of especial interest. Since, however, the hitherto known processes for the introduction of an 11:12-double bond into pregnane compounds yield very poor results, it has not been possible hitherto to employ in therapy pregnane compounds with a double bond in 11:12-position.

In accordance with the present invention, it has now been found that therapeutically active 11:12-dehydro compounds of the pregnane series can be obtained when there are used in the synthesis thereof pregnane compounds which contain in one of the positions 11 and 12 a hydroxyl group and in the other position a halogen atom e. g., bromine, chlorine and iodine, and these compounds are reacted with a heavy metal in the presence of an acid or an alcohol so as to remove the aforesaid groups to introduce the 11:12 double bond. The reaction may be carried out at any suitable temperature, for example, at either room or reflux temperatures.

The groupings necessary for therapeutic activity may already be present in the halogen hydrins used as starting materials or they can be subsequently introduced. Thus it is possible to start from compounds which contain double bonds, especially in 4:5- or 5:6-position, or also further substituents, for example free or functionally converted hydroxyl or oxo groups, preferably in 3- and 20- and, if desired, in 17- and/or 21-position. Functionally converted hydroxyl groups include a hydroxyl group esterified with an aliphatic, aromatic or heterocyclic carboxylic acid, for example acetic acid, propionic acid, benzoic acid or furane carboxylic acid, or etherified as in the case of the tetrahydropyranyloxy, benzyloxy or triphenylmethoxy group. The functionally converted oxo group may advantageously be a ketalized oxo group, derived especially from a dihydric alcohol, such as the ethylene dioxy group, or also an enolized oxo group. The above specified starting materials may be of any steric configuration and comprise also such of the so called nor- and/or homo-series, especially 19-nor-compounds. The starting materials are either known or can be prepared according to conventional processes. In particular they can be produced according to the process of our U. S. application Serial No. 392,982, filed November 18, 1953. The process comprises reacting a 11-halogen-12-oxo compound of the pregnane series with a complex hydride of an amphoteric metal, e. g. sodium borohydride or lithium borohydride to produce the corresponding 11:12 halohydrin. The latter may be dehydrohalogenated to produce the corresponding 11:12-oxido compound which can then be reacted with a halo-hydric acid to form a 11-hydroxy-12-halogen pregnane compound.

As heavy metals suitable for use in the reaction according to the present process there may be mentioned especially those of the iron group and of the second subgroup of the periodic system, especially zinc. It is preferable to carry out the reaction in the presence of a weak acid, as for example an aliphatic carboxylic acid, such as acetic acid, propionic acid, and the like, especially acetic acid, or in the presence of an aliphatic alcohol, such as methanol, ethanol or propanol.

The following examples illustrate the invention:

Example 1

0.415 gm. of 3α,12,20-trihydroxy-11α-bromopregnane is dissolved in 50 cc. of 95 percent ethanol, 2.5 cc. of zinc dust are added (the zinc having been previously treated with ice cold 2 N-sulfuric acid, washed thoroughly with boiled water and the water then displaced by means of 95 percent ethanol) and the whole is boiled for 4 hours under reflux with brisk stirring. Filtration is then carried out from zinc while still hot followed by rinsing with ethanol and benzene and the filtrate is evaporated under vacuum. The residue is dissolved in a mixture of ether and benzene (2:1), the solution washed consecutively with 0.2 N-acetic acid, water, 2 percent sodium bicarbonate solution and water, then dried with sodium sulfate and evaporated.

The crude $\Delta^{11}$-3α,20-dihydroxy-pregnene thus obtained is subjected to the addition of 75 cc. of anhydrous toluene and 10 cc. of cyclohexanone, 25 cc. of the solvent distilled off for removal of water and, after the addition of 0.408 gm. of aluminium isopropylate, the whole boiled for one hour under reflux. 25 cc. of a molar Rochelle salt solution are then added followed by treatment with steam. After cooling, the reaction product is taken up in a mixture of ether and benzene (2:1), washed with molar Rochelle salt solution and water, dried with sodium sulfate and the solution evaporated. The residue is chromatographed on 12 gms. of aluminium oxide by the flow-through method. The fractions are eluted with hexane-benzene mixtures and which are uniform by paper chromatography, yield on recrystallization from ether pure $\Delta^{11}$-3,20-diketo-pregnene of melting point 132–134° C.; $[\alpha]_D^{23} = +76° \pm 4°$ ($c = 1.130$ in chloroform).

The starting material used in this example is prepared as follows:

0.500 gm. of 3α,20-diacetoxy-11α-bromo-12-hydroxy-pregnane is dissolved in 95 cc. of methanol and after being mixed with 5 cc. of aqueous 2 N-hydrobromic acid allowed to stand for 3 days at room temperature. 10 cc. of a molar sodium acetate solution and water are then admixed and the methanol evaporated under reduced pressure. The residue is extracted with a mixture of ether and methylene chloride (3:1), and the extracts washed with 0.5 N-sodium bicarbonate solution and water, dried with sodium sulfate and evaporated under reduced pressure. On crystallization from a mixture of acetone and ether, the 3α,12,20-trihydroxy-11α-bromo-pregnane is obtained.

The 3α,20-diacetoxy-11α-bromo-12-hydroxy-pregnane used is prepared, for instance, from 3α,12α-diacetoxy-20-keto-pregnane by reduction with sodium borohydride, conversion of the resulting triol into the 3α,20-diacetate, oxidation with chromic acid and bromination to form the 3α,20-diacetoxy-11α-bromo-12-keto-pregnane, and reduction of the latter in 12-position by means of lithium borohydride.

Example 2

A solution of 0.411 gm. of 3:20-diketo-11β-hydroxy-

12α-bromopregnane in 40 cc. of glacial acetic acid is boiled under reflux for ½ hour with 2.5 gms. of zinc dust. The solution is then filtered from zinc with thorough rinsing with 95 percent ethanol and ether and the filtrate is evaporated under vacuum. The residue is taken up in a mixture of ether and benzene (2:1), the solution washed consecutively with 0.2 N-acetic acid, water, 2 percent sodium bicarbonate solution and water and after drying with sodium sulfate the solvent distilled off. From the crude product there is obtained by recrystallization from a mixture of ether and petroleum ether $\Delta^{11}$-3,20-diketopregnene of melting point 132–134° C.; $[\alpha]_D^{22}=78°\pm4°$ ($c=0.983$ in chloroform).

*Example 3*

A solution of 0.456 gm. of $\Delta^4$-3:20-diketo-11β-hydroxy-12α-iodopregnene in 120 cc. of 95 percent ethanol is stirred at room temperature for 24 hours with 5 cc. of zinc dust (activated in the manner described in Example 1). The solution is then filtered from zinc with rinsing with 95 percent ethanol and benzene and the filtrate evaporated under vacuum. The residue is worked up by extraction in the manner described in Example 2. For purification, the crude product is chromatographed on 20 gms. of aluminium oxide by the flow-through method. The eluates with hexane-benzene (3:1) and (1:1), which react with tetranitromethane with a yellow coloration, give on recrystallization from ether-petroleum ether mixtures pure $\Delta^{4:11}$-3,20-diketo-pregnadiene of melting point 178–180° C.; $[\alpha]_D^{23}=+176°\pm4°$ ($c=1.049$ in chloroform).

The starting material used in this example is prepared as follows:

While excluding daylight, 2.54 cc. of iodine-free 7.57 N-hydriodic acid are added to a solution of 0.329 gm. of $\Delta^4$-3,20-diketo-11β,12β-oxido-pregnene in 17.5 cc. of peroxide-free dioxane. After 15 minutes, the yellow solution is diluted with 40 cc. of boiled water at room temperature and the dioxane is distilled off completely, the distillation being carried out under vacuum at 20–25° C. The crude product is taken up in peroxide-free methylene chloride, the solution washed quickly with ice-cold 0.01 N-thiosulfate and water, dried with sodium sulfate and evaporated under reduced pressure at 20–25° C. The crystalline residue is the $\Delta^4$-3,20-diketo-11β-hydroxy-12α-iodo-pregnene.

The $\Delta^4$-3,20-diketo-11β,12β-oxido-pregnene is prepared, for example, by converting $\Delta^5$-3,20-bis-(ethylenedioxy)-11-keto-pregnene with elementary bromine into the 5,6,12α-tribromo derivative, reduction with lithium borohydride in tetrahydrofurane of the 12α-monobromide obtained by debromination with sodium iodide in methanol cyclization of the resulting $\Delta^5$-3,20-bis-(ethylenedioxy)-11β-hydroxy-12α-bromo-pregnene with silver oxide in pyridine to form the 11β,12β-epoxide, and elimination of the ketal groupings in the positions 3 and 20 by reaction with acetone in the presence of para-toluenesulfonic acid.

What is claimed is:

1. A process for the manufacture of 11:12-dehydro compounds of the pregnane series, which comprises reacting a pregnane compound which contains in one of the positions 11 and 12 a hydroxyl group and in the other position a halogen atom with zinc in the presence of a member of the group consisting of an aliphatic carboxylic acid and an aliphatic alcohol.

2. A process according to claim 1, wherein a 11α-halogen-12-hydroxy compound of the pregnane series is used as starting material.

3. A process according to claim 1, wherein a 11α-halogen-12β-hydroxy compound of the pregnane series is used as starting material.

4. A process according to claim 1, wherein a 12α-halogen-11-hydroxy compound of the pregnane series is used as starting material.

5. A process according to claim 1, wherein a 12α-halogen-11β-hydroxy compound of the pregnane series is used as starting material.

6. A process according to claim 1, wherein a 11α-bromo-12-hydroxy compound of the pregnane series is used as starting material.

7. A process according to claim 1, wherein a 12α-iodo-11β-hydroxy compound of the pregnane series is used as starting material.

8. A process according to claim 1, wherein the acid is acetic acid.

9. A process according to claim 1, wherein the alcohol is ethanol.

10. A process which comprises reacting 3α,12,20-trihydroxy-11α-bromopregnane with zinc in the presence of ethanol so as to produce $\Delta^{11}$-3α,20-dihydroxy-pregnene.

11. A process which comprises reacting 3,20-diketo-11β-hydroxy-12α-bromopregnane with zinc in the presence of acetic acid so as to produce $\Delta^{11}$-3,20-diketo-pregnene.

12. A process which comprises reacting $\Delta^4$-3,20-diketo-11β-hydroxy-12α-iodopregnene with zinc in the presence of ethanol so as to produce $\Delta^{4:11}$-3,20-diketo-pregnadiene.

References Cited in the file of this patent

UNITED STATES PATENTS

| | | |
|---|---|---|
| 2,403,683 | Reichstein | July 9, 1946 |

FOREIGN PATENTS

| | | |
|---|---|---|
| 273,600 | Switzerland | May 16, 1951 |
| 284,986 | Switzerland | Dec. 16, 1952 |

OTHER REFERENCES

Gallagher: Recent Progress in Hormone Research, vol. 1, pp. 84, 85, and 87 (1947).